US012683953B2

(12) United States Patent
Ramaseshan et al.

(10) Patent No.: US 12,683,953 B2
(45) Date of Patent: Jul. 14, 2026

(54) MECHANISM FOR ENFORCING ACCESS CONTROL AT SCALE TO AN INTERNET SERVICE USING TRANSPORT LAYER SECURITY (TLS)

(71) Applicant: Amazon Technologies, Inc., Seattle, WA (US)

(72) Inventors: Sathyaprasad Srivatsa Ramaseshan, Issaquah, WA (US); Hyunsoo Choe, Kirkland, WA (US); Dhruva Gaidhani, Seattle, WA (US); Ajit Domaji Rajurkar, Seattle, WA (US); Shuai Wang, Bellevue, WA (US); Srikant Iyengar, Sunnyvale, CA (US); Sanket Mohanbhai Patel, Sunnyvale, CA (US); Zhiye Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/750,867

(22) Filed: Jun. 21, 2024

(65) Prior Publication Data

US 2025/0175460 A1     May 29, 2025

Related U.S. Application Data

(60) Provisional application No. 63/602,559, filed on Nov. 24, 2023.

(51) Int. Cl.
*G06F 15/16* (2006.01)
*G06F 9/54* (2006.01)
(Continued)

(52) U.S. Cl.
CPC ...... *H04L 63/0823* (2013.01); *G06F 21/6218* (2013.01); *H04L 63/10* (2013.01)

(58) Field of Classification Search
CPC .. H04L 63/0823; H04L 63/10; G06F 21/6218
(Continued)

(56) References Cited

U.S. PATENT DOCUMENTS 6,324,648 B1    11/2001  Grantges, Jr.
7,840,812 B1 *  11/2010  Levenberg .......... H04L 63/0823
                                              713/176
(Continued)

FOREIGN PATENT DOCUMENTS

CN        115134088 A  *  9/2022  .......... H04L 9/3268
JP        2000041034 A  *  2/2000
JP          5178716 B2  *  4/2013  .............. H04L 9/32

OTHER PUBLICATIONS

Oracle Cloud Infrastructure (OCI) Certificates, Feb. 1, 2022 (Feb. 1, 2022), XP093236770, Retrieved from the Internet: URL: https:// www.oracle.com/a/ocom/docs/security/certificates-technical-brief. pdf (Year: 2022).*
(Continued)

*Primary Examiner* — Hamza N Algibhah
(74) *Attorney, Agent, or Firm* — Knobbe, Martens, Olson & Bear, LLP

(57)     ABSTRACT

Systems and methods are provided for a scalable load balancer to enable client certificate access control using mutual transport layer security authentication comprising hardware configured to receive trust store files including a certificate authority (CA) bundle and a certificate revocation list (CRL), generate a single trust store file based on the trust store files, distribute a snapshot of the single trust store file to one or more nodes of the scalable load balancer, verify, using the snapshot, a client certificate from a client device by searching for a trusted CA from the CA bundle in the snapshot, determine whether the CRL contained in the snapshot includes the client certificate, and upon verifying the client certificate and determining that the CRL does not (Continued)

contain the client certificate, transmit connection data from the client device to an application target.

20 Claims, 10 Drawing Sheets

(51) Int. Cl.
*G06F 21/62* (2013.01)
*H04L 9/40* (2022.01)
*H04L 29/06* (2006.01)

(58) Field of Classification Search
USPC ......................................................... 713/156
See application file for complete search history.

(56) References Cited

U.S. PATENT DOCUMENTS

| | | | |
|---|---|---|---|
| 9,565,180 | B2 | 2/2017 | Yerra et al. |
| 10,389,528 | B2 * | 8/2019 | Moysi ................. H04L 63/0823 |
| 11,533,185 | B1 * | 12/2022 | Sharma ................. H04L 9/3263 |
| 11,594,043 | B1 * | 2/2023 | Xu .......................... G06V 20/52 |
| 12,261,966 | B1 * | 3/2025 | Levy .................... G06F 16/9562 |
| 2002/0007346 | A1 * | 1/2002 | Qiu ........................ H04L 63/126 |
| | | | 705/50 |
| 2004/0064691 | A1 * | 4/2004 | Lu .......................... H04L 9/3268 |
| | | | 713/158 |
| 2008/0010451 | A1 * | 1/2008 | Holtzman ............. H04L 9/3273 |
| | | | 713/158 |
| 2008/0126378 | A1 * | 5/2008 | Parkinson ............... H03M 7/30 |
| 2015/0334110 | A1 * | 11/2015 | Bishop ............... H04L 63/0272 |
| | | | 713/156 |
| 2019/0228144 | A1 * | 7/2019 | Kermes ............... H04L 63/0861 |
| 2020/0052909 | A1 * | 2/2020 | Kern ..................... H04L 9/3268 |
| 2020/0412711 | A1 * | 12/2020 | Secomandi ......... H04L 63/0823 |
| 2021/0126799 | A1 * | 4/2021 | Ramana ................ H04L 9/3297 |
| 2022/0263655 | A1 * | 8/2022 | Murray ............... H04L 63/0823 |
| 2022/0329558 | A1 * | 10/2022 | Khan ..................... H04L 51/234 |
| 2022/0329584 | A1 * | 10/2022 | Sharma ................ H04L 9/3263 |
| 2023/0107962 | A1 * | 4/2023 | Benson ............... H04L 63/0823 |
| | | | 713/171 |
| 2023/0412584 | A1 * | 12/2023 | Abraham ............ H04L 63/0876 |
| 2023/0412585 | A1 * | 12/2023 | Nath ................... H04L 63/1416 |
| 2024/0097918 | A1 * | 3/2024 | Sharma ............... H04L 63/0823 |
| 2024/0428251 | A1 * | 12/2024 | Ehrenhofer ........ G06Q 20/0655 |
| 2025/0030676 | A1 * | 1/2025 | Uzun .................. H04L 63/0823 |
| 2025/0088373 | A1 * | 3/2025 | Uzun .................... H04L 9/3268 |
| 2025/0119737 | A1 * | 4/2025 | Singh ............... H04W 12/0431 |
| 2025/0175460 | A1 * | 5/2025 | Ramaseshan ........... H04L 63/10 |

OTHER PUBLICATIONS

Andjarwirawan et al., "Linux PAM to LDAP Authentication Migration", Sep. 26, 2017, International Conference in Soft Computing, Intelligent System and Information Technology (ICSIIT), IEEE, pp. 155-159.
Anonymous, "Oracle Cloud Infrastructure (OCI) Certificates", Feb. 1, 2022.
International Search Report and Written Opinion, PCT Application No. US2024/056925, mailed on Mar. 7, 2025.
Andjarwirawan Justinus et al: "Linux PAM to LDAP Authentication Migration", 2017 International Conference on Soft Computing, Intelligent System and Information Technology (ICSIIT), IEEE, Sep. 26, 2017 (Sep. 26, 2017), pp. 155-159.
Anonymous: "Oracle Cloud Infrastructure (OCI) Certificates", Feb. 1, 2022 (Feb. 1, 2022), XP093236770, Retrieved from the Internet <URL:https://www.oracle.com/a/ocom/docs/security/certificates-technical-brief.pdf>.
International Search Report and the Written Opinion Application No. PCT/US2024/056925 dated Mar. 7, 2025 in 18 pages.

* cited by examiner

*100*

CONTROL PLANE COMPONENTS
102

CONTROL
SERVER(S)
112

DATA PLANE COMPONENTS
104

COMPUTE SERVER(S)
122

BLOCK STORE
SERVER(S)
124

OBJECT STORE
SERVER(S)
126

LOAD BALANCING
AND TRUST STORE
MANAGEMENT SERVICES
140

CLOUD PROVIDER NETWORK  101

CLIENT ON-PREMISE
NETWORK
150

NETWORK(S)
130

USER COMPUTING
DEVICES
170

THIRD-PARTY
NETWORKS
160

COMPUTING SYSTEM
200

MEMORY
180

OPERATING SYSTEM
182

USER INTERFACE MODULE
184

LOAD BALANCING
AND TRUST STORE
MANAGEMENNT
MODULE
186

PROCESSOR
190

NETWORK INTERFACE
192

COMPUTER READABLE MEDIUM
194

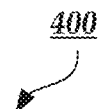
_400_
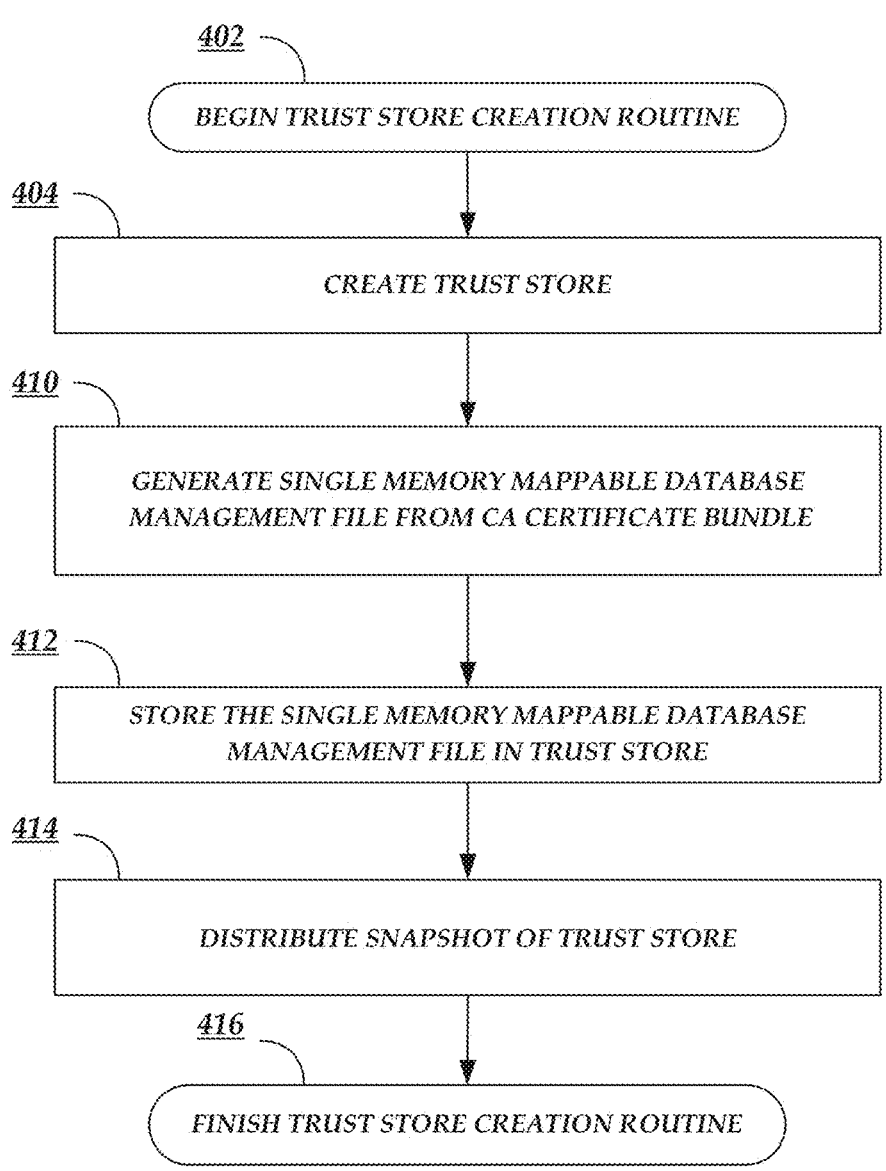
_402_
BEGIN TRUST STORE CREATION ROUTINE
_404_
CREATE TRUST STORE
_410_
GENERATE SINGLE MEMORY MAPPABLE DATABASE
MANAGEMENT FILE FROM CA CERTIFICATE BUNDLE
_412_
STORE THE SINGLE MEMORY MAPPABLE DATABASE
MANAGEMENT FILE IN TRUST STORE
_414_
DISTRIBUTE SNAPSHOT OF TRUST STORE
_416_
FINISH TRUST STORE CREATION ROUTINE
*Fig.4.*

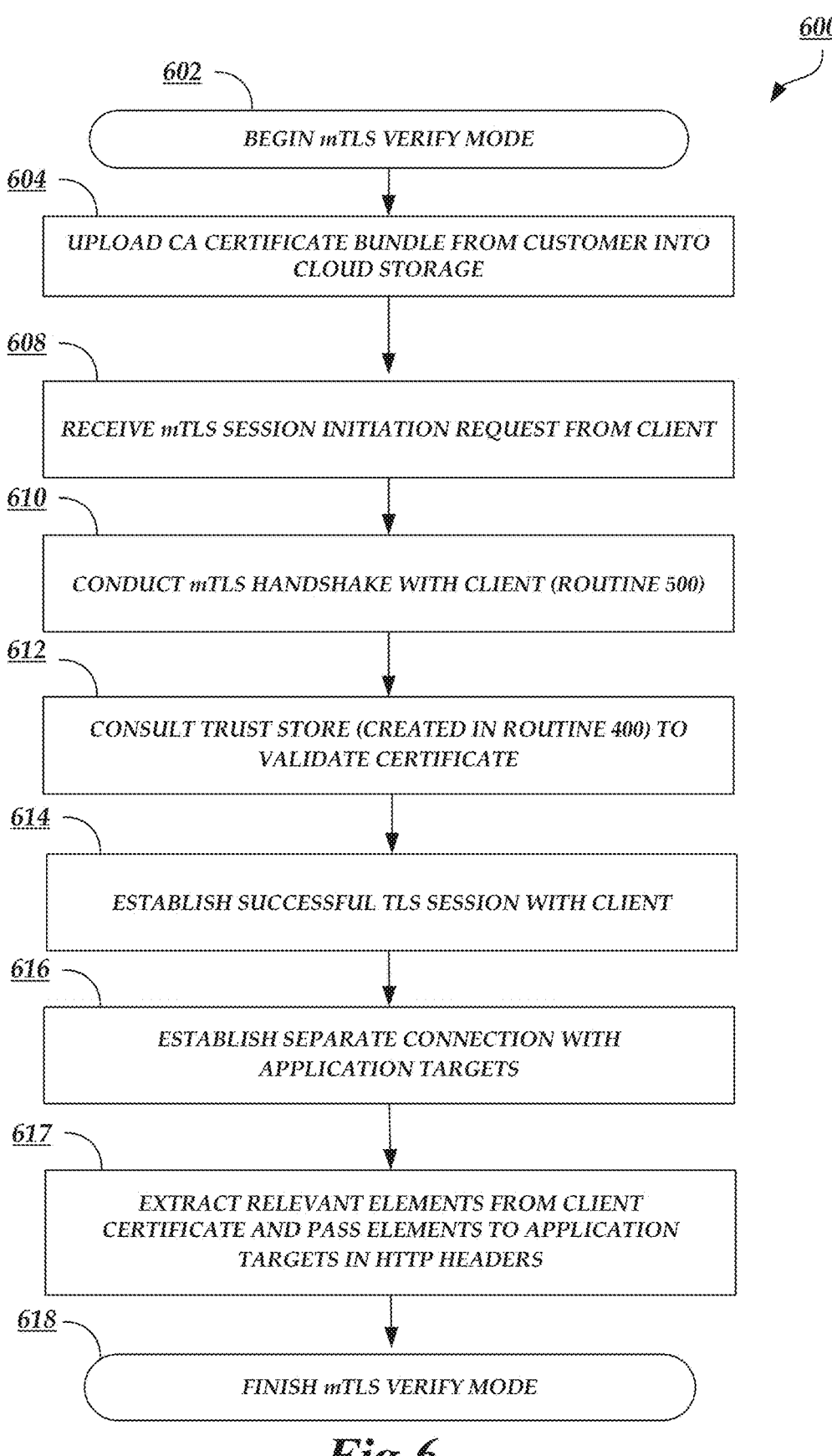

*600*

602 BEGIN mTLS VERIFY MODE

604 UPLOAD CA CERTIFICATE BUNDLE FROM CUSTOMER INTO CLOUD STORAGE

608 RECEIVE mTLS SESSION INITIATION REQUEST FROM CLIENT

610 CONDUCT mTLS HANDSHAKE WITH CLIENT (ROUTINE 500)

612 CONSULT TRUST STORE (CREATED IN ROUTINE 400) TO VALIDATE CERTIFICATE

614 ESTABLISH SUCCESSFUL TLS SESSION WITH CLIENT

616 ESTABLISH SEPARATE CONNECTION WITH APPLICATION TARGETS

617 EXTRACT RELEVANT ELEMENTS FROM CLIENT CERTIFICATE AND PASS ELEMENTS TO APPLICATION TARGETS IN HTTP HEADERS

618 FINISH mTLS VERIFY MODE

802 — BEGIN mTLS PASSTHROUGH MODE

804 — RECEIVE mTLS SESSION INITIATION REQUEST FROM CLIENT

806 — CONDUCT mTLS HANDSHAKE WITH CLIENT WITHOUT VERIFYING A CHAIN OF TRUST AGAINST A TRUST STORE OR CA

808 — CREATE A NEW SESSION WITH APPLICATION TARGET(S)

810 — INCLUDE ENTIRE CERTIFICATE CHAIN FROM CLIENT IN HTTP HEADER AND SEND TO APPLICATION TARGETS

812 — FINISH mTLS PASSTHROUGH MODE

MECHANISM FOR ENFORCING ACCESS CONTROL AT SCALE TO AN INTERNET SERVICE USING TRANSPORT LAYER SECURITY (TLS)

BACKGROUND

Modern computer systems are frequently implemented as distributed collections of computer systems operating collectively within one or more host computer system environments. Such a host computer environment may deploy computing resources across multiple servers or virtual machines and manage the computing resources on behalf of customers.

Cloud computing is a technology that allows users to access and utilize computing resources, such as compute servers, storage, databases, networking, and analytics over the internet. Instead of owning and maintaining physical hardware or software, users can leverage the services provided by cloud providers on a pay-as-you-go basis. This on-demand model offers scalability, flexibility, and cost-effectiveness, enabling individuals and businesses to efficiently deploy and manage applications without the need for extensive upfront investments.

Transport Layer Security ("TLS") is a cryptographic protocol extending from the traditional Secure Sockets Layer (SSL) protocol providing end-to-end security, authentication, and validation of data sent over a network. To establish secure communications via one-way authentication using TLS, a server provides its certificate to the client for authentication in a TLS handshake. Upon successful authentication of the server's certificate by the client, the client and server may exchange cryptographic keys to secure further communications.

BRIEF DESCRIPTION OF THE DRAWINGS

Embodiments of various inventive features will now be described with reference to the following drawings. Throughout the drawings, reference numbers may be reused to indicate correspondence between referenced elements. The drawings are provided to illustrate example embodiments described herein and are not intended to limit the scope of the disclosure.

FIG. 4 is a flowchart of an example routine for creating and initializing a trust store of an application load balancer using customer-provided data, such as a certificate authority certificate bundle and a certificate revocation list, in accordance with aspects of the present disclosure.

FIG. 6 is a flowchart of an example routine for a "verify" mode of an application load balancer using mutual Transport Layer Security for the verification of a client certificate, in accordance with aspects of the present disclosure.

DETAILED DESCRIPTION

Introduction

Figure 1:
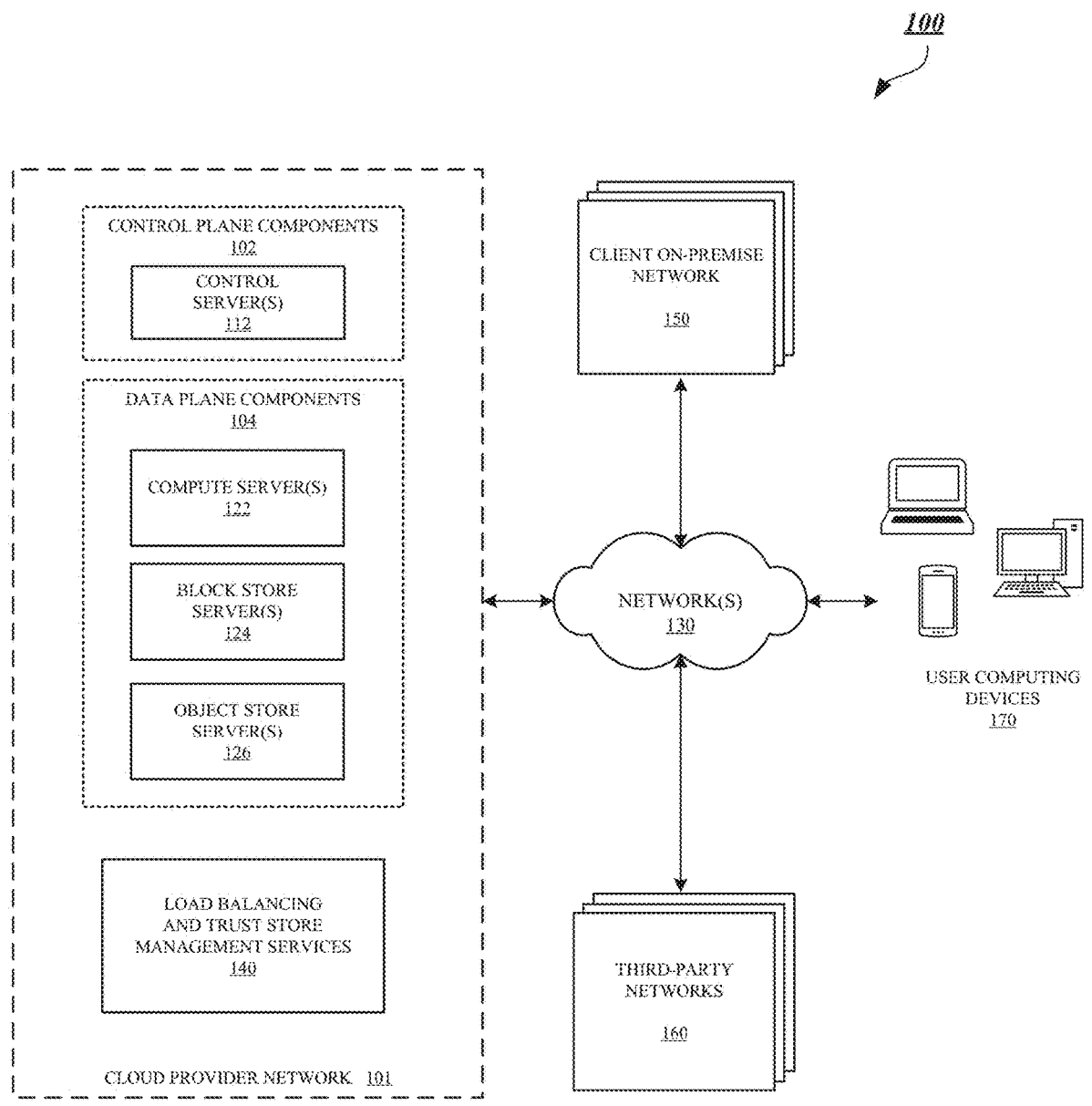
FIG. 1 depicts a schematic diagram of an illustrative cloud provider network implementing load balancing and trust store management services in accordance with aspects of the present disclosure.

The present disclosure relates to techniques for facilitating load balancing and trust store management in a distributed computing environment such as a cloud provider network. There is often a need to secure communication between clients and backend applications by verifying the identity of the connecting clients. This is typically achieved through mutual authentication, where both the client and the server authenticate each other, for example using X.509 certificates. However, implementing and managing this capability can be technically challenging and resource-intensive, as it requires building and maintaining the infrastructure to issue, distribute, and revoke client certificates, as well as to validate the certificates during the Transport Layer Security (TLS) handshake.

The aforementioned challenges, among others, are addressed by the disclosed implementation of mutual TLS authentication at a load balancer, offloading this complex client authentication process to the fully managed and scalable load balancing service. Customers can simply upload their trusted Certificate Authority (CA) certificate chains and Certificate Revocation Lists (CRLs) to a Trust Store, which is then associated with the load balancer. The load balancer can then independently verify the identity of connecting clients by validating their certificates against the trusted roots in the Trust Store, and optionally check the CRLs to ensure the certificates have not been revoked. This allows customers to focus on their business logic while ensuring secure communication with their applications.

Specifically, the present disclosure describes systems, methods, and devices for using an application load balancer in a cloud computing environment to conduct two-way mTLS authentication between a client and an application load balancer. Such solutions allow the application load balancer to offload the client authentication process from backend applications while ensuring that only trusted clients can communicate with the backend application. The present disclosure provides systems, methods, and devices for trust store management, revocation support, a passthrough mode of the application load balancer, and connection logging. With trust store management in an application load balancer, customers can upload their trusted certificate authority certificate chains and certificate revocation lists to a trust store which is then associated with the application load balancer. With revocation support in an application load balancer, customers can upload certificate revocation lists to the trust store, allowing the application load balancer to check if a client certificate has been revoked during an mTLS handshake. With passthrough mode in an application load balancer, the application load balancer can be optionally configured to pass the client certificate information to the backend applications without performing the authentication itself. This allows the application to perform the authorization based on the client certificate. With connection logging in an application load balancer, the application load balancer can provide detailed connection logs, including the client certificate information and the result of an mTLS verification, which can be used for debugging and auditing purposes. These aspects of the disclosure, among others, offload the complex client authentication process to the fully managed and scalable application load balancer.

In traditional solutions establishing a secure connection for communication between a client and server, "one-way" TLS handshakes have been used to authenticate the certificate of the server (and thus, the server's identity) to the client upon the client's request. However, as security needs evolve, there is a shift towards use of "two-way" TLS handshakes (otherwise known as "mutual TLS" or "mTLS") for authentication between communicating parties over a network. In an mTLS handshake, the server is no longer the only party whose certificate is authenticated: instead, both parties exchange certificates for authentication by the other.

In previous solutions, customers desiring to use mTLS to validate client certificates had to build their own custom solutions at the application layer, requiring additional time and management overhead. Such customers spent their engineering resources to build and subsequently maintain the functionality to support mTLS authentication in their backend code, attempting and often failing to keep up with the latest security patches. These customers also must invest heavily in infrastructure to create and rotate certificates in CA hierarchies. The technical challenges, high up-front investment, and continuous operational pain make it difficult for customers to reliably authenticate certificate-based client identities on their own. Such home-grown, custom solutions are only possible for customers who own both the client and the target application (because both must be kept in sync). Thus many customers cannot implement such mechanisms even if they had the resources to invest in custom solutions because they do not own the target application or hardware.

These aforementioned challenges, among others, are addressed in some embodiments by the disclosed techniques for providing load balancing and trust store management services at scale. With mTLS authentication on load balancers (e.g., application load balancers, elastic load balancers, network load balancers), customers may have a fully managed, scalable, and cost-effective way to enforce access control. Mutual authentication on load balancers enables customers to use their developer resources to focus on other critical projects rather than building and maintaining complicated home grown solutions. The load balancer can authenticate clients with revocation checks and pass client certificate information to the application layer for authorization. Customers can either use their existing third-party certificate authority or private certificate authority provided by the system as the source of trust to validate their client certificates.

As will be appreciated by one of skill in the art in light of the present disclosure, the embodiments disclosed herein improve the ability of computing systems and systems that provide load balancing and security services (e.g., data storage systems and compute systems) to more quickly and securely provide mechanisms for controlling access to resources and services.

The presently disclosed embodiments therefore address technical problems inherent within computing systems, such as facilitating client certificate access control within load balancers, providing efficient trust store management at a previously unachievable scale through use of a single memory mappable database management file, and improving security through mutual authentication of client certificates. These technical problems are addressed by the various technical solutions described herein, including the provision of load balancing and trust store management services. Thus, the present disclosure represents an improvement on existing load balancing and security management systems, and computing systems in general.

Various aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only and are not intended to be limiting. In addition, any feature, process, device, or component of any embodiment described and/or illustrated in this specification can be used by itself, or with or instead of any other feature, process, device, or component of any other embodiment described and/or illustrated in this specification, without limitation.

Overview of Example Computing Environment

FIG. 1 depicts an example computing environment 100 including a cloud provider network 101 in which the disclosed load balancing and trust store management services 140 can be implemented. Although the description that follows will focus on load balancing and trust store management services 140 implemented within a cloud computing network, this description is provided for purposes of illustration only and is not intended to be limiting, required, or exhaustive. In some embodiments, the load balancing and trust store management services 140 and operations associated therewith may be implemented in other settings and may take other forms.

As shown, the computing environment 100 includes a cloud provider network substrate 101 (also referred to herein as a "cloud provider network," "provider network," "cloud provider system", or simply as a "cloud" for convenience), any number of client on-premise networks 150 (also referred to herein simply as "on-premise networks" for convenience) external to the cloud provider network 101, and any number of third-party networks 160 external to the cloud provider network 101. The cloud provider network 101, on-premise networks 150, and third-party networks 160 may communicate with each over via a network(s) 130, such as an intranet or the Internet.

The cloud provider network 101 is a pool of network-accessible computing resources (such as compute, storage, and networking resources, applications, and services), which may be virtualized or bare-metal. The cloud provider network 101 can provide convenient, on-demand network access to a shared pool of configurable computing resources that can be programmatically provisioned and released in response to client commands. These resources can be dynamically provisioned and reconfigured to adjust to variable load, which provides the "elasticity" of the cloud provider network 101. Cloud computing can thus be considered as both the applications delivered as services over a publicly accessible network (e.g., the Internet, a cellular communication network) and the hardware and software in cloud provider data centers that provide those services. It will be appreciated that the disclosed techniques for facilitating load balancing and trust store management services 140 may be implemented in non-elastic computing environments as well.

A container, as referred to herein, packages up code and all its dependencies so an application (also referred to as a task, pod, or cluster in various container environments) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare metal servers.

In the context of some software container services, a task refers to a container, or multiple containers working together, running to execute the functionality of a software application or a particular component of that application. A cluster refers to a logical grouping of tasks. In some implementations, tasks can also include virtual machines, for example, virtual machines running within instance(s) hosting the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example, linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

In some implementations, customers of the cloud provider network 101 can deploy containers by managing clusters of compute instances that run container agents. As described herein, such compute instances can be implemented within the cloud provider network 101. In such implementations, customers manage scaling, monitoring, patching, and security of the compute instances, in addition to managing their containerized workload. In some implementations, customers of a cloud provider may deploy and scale containerized workloads automatically without having to manage the underlying computing resources, for example, via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of compute instances on behalf of the customer.

As used herein or in the appendices, the term "virtual private cloud network environment" (often shortened herein to "virtual private cloud" or simply "VPC") refers to a virtualized network environment, in which a collection of computing devices are enabled by a substrate network to communicate as if the collection of computing devices existed within a local area network (LAN) environment. Accordingly, the devices within a VPC may often share a common subnet, and (from the perspective of the devices) directly communicate with one another without the use of complex routing protocols. However, unlike traditional LANs, the devices within a VPC need not share a direct physical interconnection. Instead, the devices may be located in geographically diverse regions, and in some instances may themselves be virtual devices (e.g., virtual machines). A substrate (e.g., physical) network, as will be described below, may encapsulate or otherwise alter communications from devices associated with the VPC to create the illusion, from the point of view of devices within the VPC, that a LAN environment exists.

VPCs can provide many advantages over traditional LANs, in that the configuration of computing devices can be changed dynamically, via software, without changing a physical configuration of devices. Moreover, VPCs maintain many benefits of traditional LANs, in that communications between the computing devices are relatively simple and secure. In part because a VPC or other virtual network environment can be set up without the need to dedicate entire hardware resources specifically to a given VPC, some VPC owners or administrators choose to establish hundreds or even thousands of individual VPCs for various purposes of a company or organization. As a default at the time a new VPC is created by such an owner or administrator, it may not have connectivity to any other VPCs associated with the owner or administrator. According to existing systems, the owner of a VPC may individually associate that VPC with another VPC in a one-to-one manner, which may be considered a VPC peering process, in order to enable communications between those two VPCs. In this manner, a VPC owner may, for example, set up edge connectivity to a public network at a first peered VPC, and configure the second peered VPC to access the public network via the first VPC. While this peering approach is sufficient in some instances, it is not an efficient approach to establishing relationships between many different VPCs (e.g., dozens, hundreds, or even thousands, any of which may be desired by a given administrator depending on the circumstances).

Although not shown in FIG. 1, some implementations of cloud provider network 101 can additionally include domain name services ("DNS") servers, relational database servers, and other server configurations (not illustrated) for supporting on-demand cloud computing system Each server includes hardware computer memory and/or processors, an operating system that provides executable program instructions for the general administration and operation of that server, and a computer-readable medium storing instructions that, when executed by a processor of the server, allow the server to perform its intended functions.

The cloud provider network 101 can provide on-demand, scalable computing services to users through a network, for example allowing users to have at their disposal scalable "virtual computing devices" via their use of the compute servers 122 (which provide compute instances via the usage of one or both of central processor units ("CPUs") and graphics processing unites ("GPUs"), optionally with local storage) and block store servers 124 (which provide virtualized persistent block storage for designated compute instances). These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface, software development kit, or the like, to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. An application programming interface ("API") refers to an interface and/or communication protocol between a client and a server, such that if the client makes a request in a predefined format, the client should receive a response in a specific format or initiate a defined action. In the cloud provider network context, APIs provide a gateway for clients to access cloud infrastructure by allowing clients to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their clients or clients. The load balancing and trust store management services 140 may provide a set of APIs that can be used by the users of user computing devices 170 to perform one or more techniques or operations described herein or in the appendices.

The cloud provider network 101 may implement various computing resources or services, which may include a virtual compute service, data processing service(s) (e.g., map reduce, data flow, and/or other large scale data processing techniques), data storage services (e.g., object storage services, block-based storage services, or data warehouse storage services), a Kubernetes-based container orchestration and management service (referred to in various implementations as a container service for Kubernetes, Azure Kubernetes service, IBM cloud Kubernetes service, Kubernetes engine, or container engine for Kubernetes), and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts. The disclosed techniques for facilitating load balancing and trust store management can be implemented as part of a virtual compute service, container service, or Kubernetes-based container service in some embodiments.

A cloud provider network 101 can be formed as a number of regions, where a region is a separate geographical area in which the cloud provider clusters data centers. In some embodiments, each region may be implemented as or otherwise treated as a region-based autonomous system ("AS"). Each region can include two or more availability zones connected to one another via a private high-speed network, for example a fiber communication connection. An availability zone ("AZ") refers to an isolated failure domain including one or more data center facilities with separate power, separate networking, and separate cooling from those in another availability zone. Preferably, availability zones within a region are positioned far enough away from one another that the same natural disaster should not take more than one availability zone offline at the same time. Regions are connected to a global network connecting each region to at least one other region. This global network can be referred to as the cloud provider backbone network in some embodiments. The cloud provider backbone network can be built on a private global, fully redundant, fiber network that is linked via trans-oceanic cables across various oceans and seas.

Clients can connect to availability zones of the cloud provider network via a publicly accessible network (e.g., the Internet, a cellular communication network). Transit Centers ("TC") are the primary backbone locations linking clients to the cloud provider network, and may be co-located at other network provider facilities (e.g., Internet service providers, telecommunications providers). Each region can operate two TCs for redundancy. The cloud provider network may deliver content from points of presence outside of, but networked with, these regions by way of edge locations and regional edge cache servers (points of presence, or "PoPs"). In some implementations, the cloud provider network can include one or more cellular networks managed and provided by the cloud provider, which can include access points at a client's premise and which can use in-region resources to run various parts of the network.

The cloud provider network 101 can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators ("NATs"), and so on, as well as the physical connections among the devices. The substrate may be isolated from the rest of the cloud provider network 101, for example it may not be possible to route from a substrate network address to an address in a production network that runs services of the cloud provider, or to a client network that hosts client resources.

The cloud provider network 101 can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., VPCs, security groups). A mapping service can coordinate the routing of these network packets. The mapping service can be a regional distributed look up service that maps the combination of overlay IP and network identifier to substrate IP so that the distributed substrate computing devices can look up where to send packets.

To illustrate, each physical host (e.g., a compute server 122, a block store server 124, an object store server 126, a control server 112, etc.) can have an IP address in the substrate network. Hardware virtualization technology can enable multiple operating systems to run concurrently on a host computer, for example as virtual machines ("VMs") on a compute server. A hypervisor, or virtual machine monitor ("VMM"), on a host allocates the host's hardware resources amongst various VMs on the host and monitors the execution of VMs. Each VM may be provided with one or more IP addresses in the overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 101. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

The traffic and operations of the provider network substrate may broadly be subdivided into two categories in various embodiments: control plane traffic carried over a logical control plane and data plane operations carried over a logical data plane. While the data plane represents the movement of user data through the distributed computing system, the control plane represents the movement of control signals through the distributed computing system. The control plane generally includes one or more control plane components 102 distributed across and implemented by one or more control servers 112. Control plane traffic generally includes administrative operations, such as establishing isolated virtual networks for various clients, monitoring resource usage and health, identifying a particular host or server at which a requested compute instance is to be launched, provisioning additional hardware as needed, and so on. The data plane generally includes one or more data plane components 104 distributed across and implemented by one or more data plane servers. The data plane includes client resources that are implemented on the cloud provider network 101 (e.g., computing instances, containers, block storage volumes, databases, file storage, etc.). Data plane traffic generally includes non-administrative operations such as transferring data to and from the client resources.

Certain control plane components 102 (e.g., tier one control plane components such as the control plane for a virtualized computing service) are typically implemented on a separate set of servers from the data plane components 104, while other control plane components 102 (e.g., tier two control plane components such as analytics services) may share virtualized servers with data plane components 104. Resources of the control plane can be provisioned in an account (or accounts) of the cloud provider, while resources of the data plane can be provisioned in respective user accounts.

Control plane traffic and data plane traffic may be sent over separate/distinct networks. In some embodiments, control plane traffic and data plane traffic can be supported by different protocols. In some embodiments, messages (e.g., packets) sent over the provider network include a flag to indicate whether the traffic is control plane traffic or data plane traffic. In some embodiments, the payload of traffic may be inspected to determine its type (e.g., whether control or data plane). Other techniques for distinguishing traffic types are possible.

As illustrated, the data plane components 104 can include one or more compute servers 122, which may be bare metal (e.g., single tenant) or may be virtualized by a hypervisor to run multiple VMs (sometimes referred to as "instances") for one or more clients. These compute servers 122 can support a virtualized computing service of the cloud provider network 101. The cloud provider network 101 may offer virtual compute instances with varying computational and/or memory resources. In one embodiment, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a client, e.g., based (at least in part) on input from the client. For example, a client may choose an instance type from a predefined set of instance types. As another example, a client may specify the desired resources of an instance type and/or requirements of a workload that the instance will run, and the instance type selection functionality may select an instance type based on such a specification.

The data plane can also include one or more block store servers 124, which can include persistent storage for storing volumes of client data as well as software for managing these volumes. These block store servers can support a managed block storage service of the cloud provider network 101. The block store servers 124 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from 1 GB to 1 terabyte TB (or more) in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to 16) with each partition hosted by a different host. The data of the volume may be replicated between multiple devices within the provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane can also include one or more object store servers 126, which represent another type of storage within the cloud provider network 101. The object storage servers 126 include one or more servers on which data is stored as objects within resources referred to as buckets and can be used to support a managed object storage service of the cloud provider network 101. Each object typically includes the data being stored, a variable amount of metadata that enables various capabilities for the object storage servers with respect to analyzing a stored object, and a globally unique identifier or key that can be used to retrieve the object. Each bucket is associated with a given user account. Clients can store as many objects as desired within their buckets, can write, read, and delete objects in their buckets, and can control access to their buckets and the objects contained therein. Further, in embodiments having a number of different object storage servers distributed across different ones of the regions described above, users can choose the region (or regions) where a bucket is stored, for example to optimize for latency. Clients may use buckets to store objects of a variety of types, including machine images that can be used to launch VMs, and snapshots that can be used to restore volumes.

Some clients may desire to use the resources and services of the cloud provider network 101, but for various reasons (e.g., latency in communications with client devices, legal compliance, security, or other reasons) prefer for these resources and services to be provisioned within their own network, for example in a client on-premise network 150. A piece of the cloud provider network-referred to herein as a "provider substrate extension" or PSE—may be provisioned within the client on-premise network 150. A client may access their PSE via the cloud provider network 101 or their own network and may use the same APIs to create and manage resources in the PSE as they would use to create and manage resources in the cloud provider network 101 region.

The PSE may be pre-configured, e.g., by the provider network operator, with the appropriate combination of hardware with software and/or firmware elements to support various types of computing-related resources, and to do so in a manner that mirrors the experience of using the cloud provider network 101. For example, one or more PSE servers can be provisioned by the cloud provider within the client on-premise network 150. As described above, the cloud provider network 101 may offer a set of predefined instance types, each having varying types and quantities of underlying hardware resources. Each instance type may also be offered in various sizes. In order to enable clients to continue using the same instance types and sizes in their PSE as they do in the cloud provider network 101 region, the PSE server can be a heterogeneous server. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the PSE server, meaning while other VMs are still running and consuming other capacity of the PSE server. This can improve utilization of resources within the PSE by allowing for better packing of running instances on physical hosts, and also provides a seamless experience regarding instance usage across the cloud provider network 101 region and PSE.

In the manner described above, a PSE forms an edge location, in that it provides the resources and services of the cloud provider network outside of a traditional cloud provider data center and closer to client devices. An edge location, as referred to herein, can be structured in several ways. In some implementations, an edge location can be an extension of the cloud provider network substrate including a limited quantity of capacity managed by the cloud provider but provided outside of a traditional availability zone (e.g., in a small data center or other facility of the cloud provider that is located close to a client workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a far zone may have substantial capacity, for example thousands of racks or more.

In some implementations, an edge location may be an extension of the cloud provider network substrate formed by one or more servers located on-premise in a client or partner facility, wherein such server(s) communicate over a network (e.g., a publicly accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the client who owns the premises (and any other accounts allowed by the client). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with client resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to client devices and/or workloads.

The cloud provider network 101 may also include load balancing and trust store management services 140. The load balancing and trust store management services 140 are specialized hardware, or a combination of hardware and software, that may execute algorithms and functions to enforce client certificate access control at scale and manage trust stores. Using mTLS, an application load balancer ("ALB") within the load balancing and trust store management services 140 may negotiate mutual authentication with the user computing devices 170 of a client. In some embodiments, the load balancing and trust store management services 140 may be partially or completely within the control plane 102 and/or the data plane 104.

Example Architecture of Computing System

Figure 2:
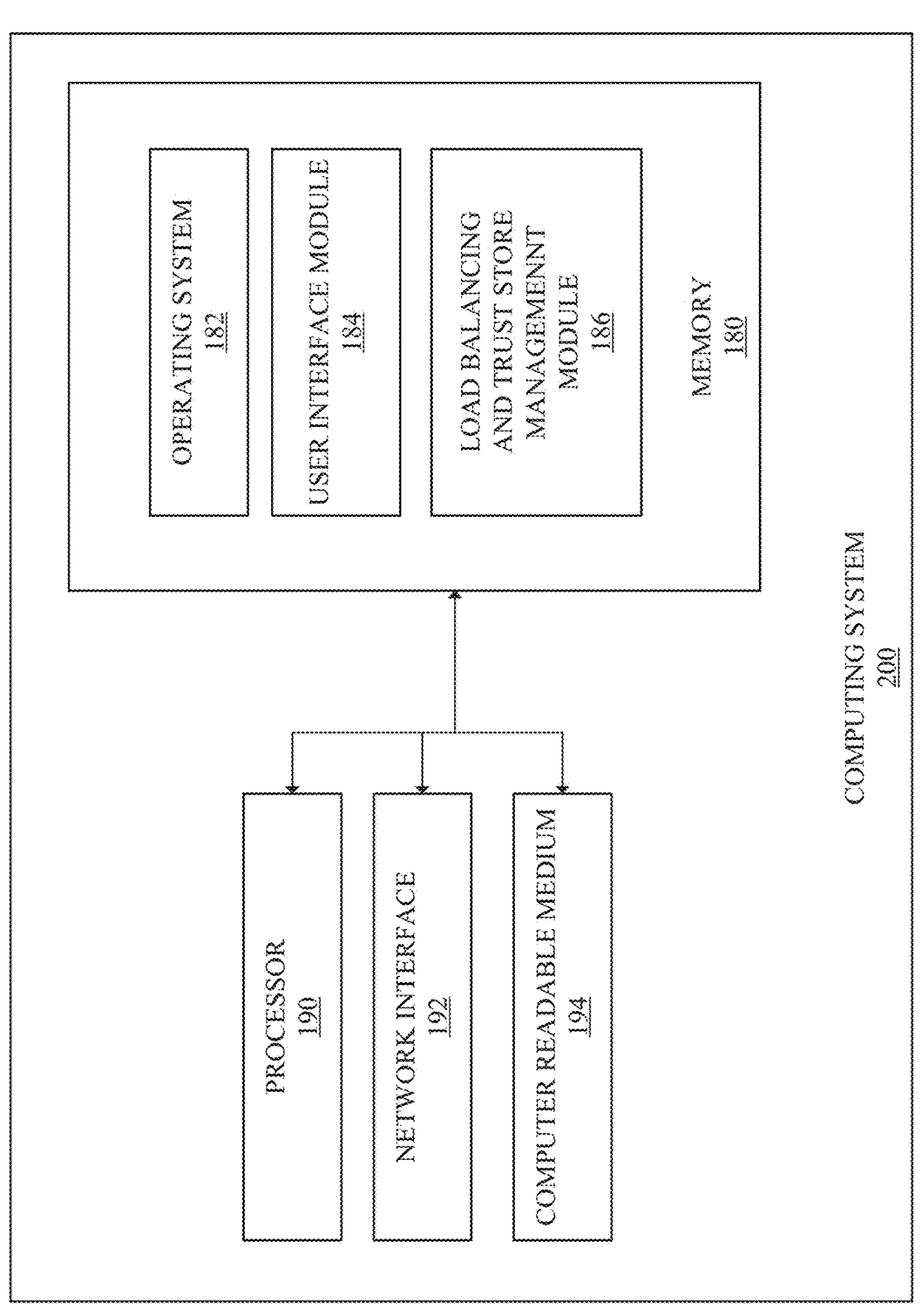
FIG. 2 depicts a general architecture of a computing device or system usable to implement load balancing and trust store management services, in accordance with aspects of the present disclosure.

FIG. 2 depicts an example architecture of a computing system 200 that can be used to implement load balancing and trust store management services, in accordance with aspects of the present disclosure described herein or in the appendices. The general architecture of the computing system 200 depicted in FIG. 2 includes an arrangement of computer hardware and software modules that may be used to implement one or more aspects of the present disclosure (including the appendices). The computing system 200 may include many more (or fewer) elements than those shown in FIG. 2. It is not necessary, however, that all of these elements be shown in order to provide an enabling disclosure. For example, the computing system 200 may be used to implement one or more of the elements described herein, including the load balancing and trust store management services 140, block store server(s) 124, object storage server(s) 126, compute servers 122, and/or the user computing devices 170.

As illustrated, the computing system 200 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 130 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor 190 in the general administration and operation of the computing system 200. The memory 180 may further include computer program instructions and other information for implementing one or more aspects of the present disclosure. For example, in one embodiment, the memory 180 includes a user interface module 184 that generates user interfaces (and/or instructions) for display upon a user computing device (e.g., user computing device 170 of FIG. 1), e.g., via a navigation and/or browsing interface such as a browser or application installed on the user computing device. In addition, the memory 180 may include or communicate with one or more data stores. Throughout this present disclosure, users of the user computing devices 170 may also be referred to as "customers" or "customers of the cloud provider."

In addition to and/or in combination with the user interface module 184, the memory 180 may include a load balancing and trust store management module 186 that may be executed by the processor 190. In one embodiment, the load balancing and trust store management module 186 implements various aspects of the present disclosure, e.g., those described herein or in the appendices.

Although a single processor, a single network interface, a single computer-readable medium, and a single memory are illustrated in the example of FIG. 2, in other implementations, the computing system 200 can have a multiple of one or more of these components (e.g., two or more processors and/or two or more memories).

Access Control at Scale Using mTLS in a Load Balancer

Figure 3:
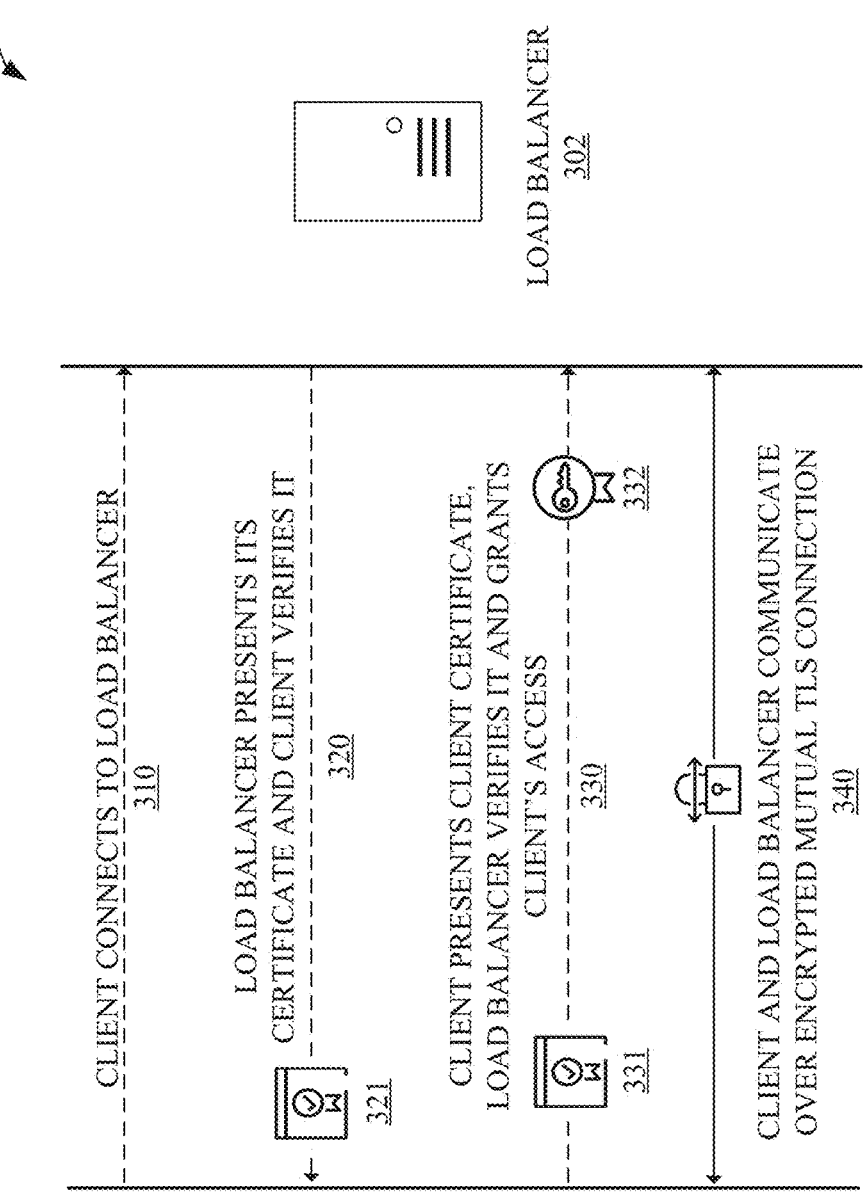
FIG. 3 depicts an illustrative diagram of a mutual Transport Layer Security handshake and certificate verification between a client and a load balancer to establish an encrypted connection, in accordance with aspects of the present disclosure.

FIG. 3 depicts an illustrative diagram 300 of an mTLS handshake and certificate verification between a client 301 and a load balancer 302 (e.g., an ALB) to establish an encrypted connection 332, in accordance with aspects of the present disclosure. In some embodiments, the mTLS handshake in diagram 300 occurs in a model of network layers called an Open Systems Interconnection ("OSI") model. The OSI model contains seven stacked network layers: 1) physical, 2) data link, 3) network, 4) transport, 5) session, 6) presentation, and 7) application. The events of diagram 300 occur within layer six, the presentation layer. The presentation layer converts data to and from layer seven, the application layer. Conducting the mTLS handshake at presentation layer six allows the client 301 and the load balancer 302 to exchange cryptographic keys used to subsequently encrypt the data sent back and forth between them at the application layer, layer seven. A bad actor seeking to intercept such data transmission at the application layer would be thus prevented from being able to make sense of the intercepted encrypted data. Further, by performing the mTLS handshake at layer six using the load balancer 302, resources at application layer seven are freed up to do other tasks rather than having to conduct authentication procedures for an exchange between the client 301 and the load balancer 302.

Turning again to FIG. 3, the mTLS handshake begins at arrow 310 when the client 301 initiates a TLS session with the load balancer 302 and then connects to the load balancer 302. At arrow 320, the load balancer 302 responds by presenting its certificate 321 (issued by a certificate authority as proof that the load balancer 302 is in fact the identity it claims to be) to the client 301 for verification. In some embodiments, the load balancer 302 may also present its certificate chain and public key along with its certificate 321 to the client 301. The client 301 may then verify the load balancer's certificate 321 by confirming that the certificate 321 is valid. To do this, the client 301 may verify the signature on the load balancer's certificate 321 using the public key of the signing certificate authority ("CA") to ensure that the certificate 321 was truly signed using the CA's private key. After verifying the signature, the client 301 also verifies that the load balancer's certificate 321 belongs to the intended load balancer by creating a randomly generated secret key and encrypting it with the load balancer's 302 public key. The client 301 may then send the secret key to the load balancer 302 for decryption. The load balancer 302 may then decrypt the secret key sent by the client 301. If the client 301 is unable to verify the load balancer's certificate 321 in this way (or another related certificate verification method, as will be understood by those skilled in the art), the client 301 may drop the connection.

If the client 301 successfully verifies the information provided by the load balancer 302, the client 301 may proceed at arrow 330 by presenting its own client certificate 331 to the load balancer 302 for verification. It is here at arrow 330 that an mTLS ("two-way") handshake diverges from a traditional TLS ("one-way") handshake in which only the load balancer 302 would be verified. At arrow 330, the client 301 is also verified before an encrypted connection can be established. Similarly to arrow 320, in some embodiments at arrow 330, the client 301 may present its certificate chain and public key along with its client certificate 331 for verification by the load balancer 302. The load balancer 302 may then verify the client certificate 331 by confirming that the client certificate 331 is valid. To do this, the load balancer 302 may verify the signature on the client certificate 331 using the public key of the signing certificate authority ("CA") to ensure that the client certificate 331 was truly signed using the CA's private key. After verifying the signature, the load balancer 302 also verifies that the client certificate 331 belongs to the intended client by creating a randomly generated secret key and encrypting it with the client's 301 public key. The load balancer 302 may then send the secret key to the client 301 for decryption. The client 301 may then decrypt the secret key sent by the load balancer 302. If the load balancer 302 is unable to verify the client certificate 331 in this way (or another related certificate verification method, as will be understood by those skilled in the art), the load balancer 302 may drop the connection.

If the load balancer 302 successfully verifies the information provided by the client 301, the load balancer may grant access to the client 301 in the form of an exchange of cryptographic keys. In this way, at arrow 340, the client 301 and load balancer 302 may communicate at layer seven of the network stack over an encrypted mTLS connection established through the load balancer 302 at layer six of the network stack.

FIG. 4 is a flowchart of an example routine 400 for creating and initializing a trust store of a load balancer (e.g., an ALB) using customer-provided data, such as a CA certificate bundle and a certificate revocation list ("CRL"), in accordance with aspects of the present disclosure. The trust store creation routine begins at block 402. At block 404, a trust store for the ALB is created from data provided by the customer. The customer of the cloud provider may provide the cloud provider with the CA that generated the certificates the customer wishes to store in the ALB's new trust store. In some embodiments, the customer provides the cloud provider with what may be called a "CA certificate bundle." A CA certificate bundle is a group of CA certificates (root or intermediate) that may be used by a trust store. These CA certificates may have been generated by a private certificate authority or any other third party CA, and they may serve as a source of validation for client certificates. A trust store may only contain one CA certificate bundle at a time, but that bundle may be replaced at any time after creation of the trust store at block 404 by using a dedicated API to modify the trust store.

A CRL is a list of certificate serial numbers released by a CA containing data for certificates that have been revoked by that CA. A CRL may be provided by the customer to the cloud provider, and it details any number of certificates to whom the customer may wish for the ALB to deny connection. This may be a list of serial numbers of certificates that have expired, been rotated, been deleted, or have otherwise been compromised or removed by the CA that generated the certificates in the CA certificate bundle. Because the customer provides the CA to the cloud provider as part of block 404, and because this CA necessarily has context for which serial numbers are currently valid and which serial numbers have been removed, the CA is key to using a CRL for access control within the trust store of an ALB. In some embodiments, a customer may choose not to provide a CRL to the trust store; providing a CRL is optional and customer preferences dictate its use.

Upon receiving the CA certificate bundle and the CRL (if provided), the cloud provider may upload the CA certificate bundle (and optionally, the CRL) to an object storage service in the cloud provider network 101. In some embodiments, upon upload of the CA certificate bundle to the object storage service, the object storage service may return a path indicating the location the CA certificate bundle was stored. Similarly, the object storage service may return a path for the location the CRL was stored. In some embodiments, the ALB receives the cloud object storage paths to the CA certificate bundle and the CRL, as applicable. In this way, scalability is supported by removing the need to make many physical copies of the information in the CA certificate bundle and the CRL. Rather, the object storage paths may point to the location in the object storage service where this information is stored. If a CRL has been added to the trust store, it is assigned a unique revocation ID. The revocation ID is increased for every new CRL added to the trust store, and revocation IDs may not be changed. If a CRL is deleted from a trust store, its revocation ID is also deleted and may not be reused for the duration of the life of that trust store.

At block 410, the ALB uses the CA certificate bundle and CRL provided by the customer to generate a new single file. This single file uses a memory mappable database management file format, such as SQLite or RocksDB. In some embodiments, this single memory mappable database management file takes the form of a lightning memory database ("LMDB") file. This new single LMDB file provides a number of efficiency advantages for the access control implemented by the ALB. In some embodiments, when the ALB receives an incoming client certificate for verification, it in some cases runs a validation against over 100 million entries in a CRL to determine if that specific incoming client certificate is contained in the CRL. Because TLS handshakes usually happen within a few milliseconds, that is all the time the ALB has to check the CRL. With the CA certificate bundle and CRL stored in a single memory mappable database management file in the trust store of the ALB, the ALB is able to conduct the handshake within the few millisecond window. This timing is achieved in part because of the structure of a memory mappable database management file such as an LMDB file: an LMDB file contains multiple databases. In some embodiments, the single LMDB file generated for the trust store of the ALB contains two databases, one of which contains the CA certificate chains. The second database contains the CRL data. In this second database, a mapping with a key value is used. Specifically, the serial numbers of the revoked certificates in the CRL serve as the keys for the mapping to the second database. This means that when the ALB receives an incoming client certificate, all it must do is pull the serial number from the certificate and check to see if the serial number exists in the second database. In this way, the ALB does not have to run a check against the potential millions of entries in the first database of the LMDB file, but rather providing a form of access that is constant through use of the serial number key from the second database in the LMDB file.

At block 412, the single memory mappable database management file generated at block 410 (e.g., an LMDB file) is stored in the trust store of the ALB. At block 414, a snapshot of the trust store storing the single memory mappable database management file is distributed by the trust store to appropriate recipients. In some embodiments, the recipients may be all the nodes of the ALB. In some cases, the ALB may have anywhere between 2-100 ALB nodes, and the snapshot may be delivered to each node. In alternative embodiments, the trust store may distribute its snapshot to any number of different load balancers (e.g., ALBs) across any number of different user accounts. In this way, a trust store can be associated with multiple load balancers and multiple user accounts at any time after its creation. This feature provides for massive scalability of this access control solution. With a snapshot now in each node of the ALB across all relevant ALBs and accounts, each ALB node may independently verify incoming client certificates by searching for a trust path from a trusted certificate in the trust store to the client certificate. To support large scale CRLs, the snapshot of the trust store that is distributed at scale is constructed in a pre-indexed format, allowing for rapid searching without requiring the entire trust store to be loaded into memory and foregoing the need to open, close, or otherwise access multiple files, which quickly becomes resource intensive. At block 416, the trust store creation routine 400 is complete, and the ALB is ready to field client certificate authentication requests.

Figure 5:
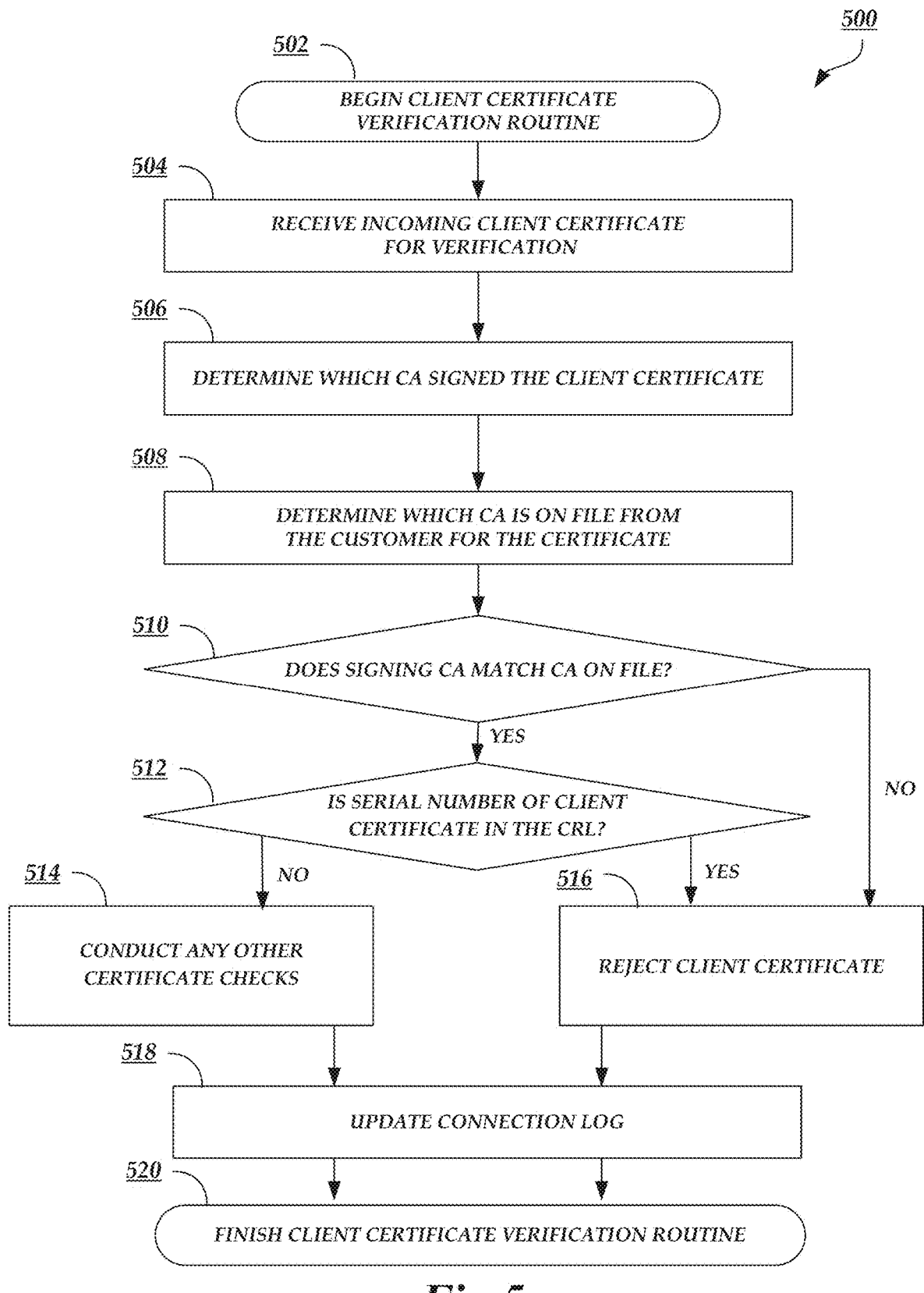
FIG. 5 is a flowchart of an example routine for verification of a client certificate by an application load balancer using mutual Transport Layer Security, in accordance with aspects of the present disclosure.

FIG. 5 is a flowchart of an example routine 500 for verification of a client certificate by an ALB using mTLS, in accordance with aspects of the present disclosure. The client certificate verification routine begins at block 502. At block 504, the ALB receives an incoming client certificate requiring verification amidst an mTLS handshake. At block 506, the ALB checks the client certificate to determine which CA signed the client certificate. At block 508, the ALB determines which CA is on file from the customer for this specific certificate. At decision block 510, the ALB makes a comparison between the CA it identified in block 506 and the CA it identified in block 508. If the signing CA (block 506) is the same as the CA the customer has on file for that certificate in the trust store, the routine proceeds to block 512. At second block 512, the ALB runs another check to determine if the serial number of the client certificate is contained within the CRL in the trust store. If the serial number is not found within the CRL, the routine may proceed to block 514, at which point the ALB may run any additional certificate checks according to different embodiments or client preferences.

However, if the ALB determines that: 1) the CAs at decision block 510 are not the same, or 2) that the serial number of the client certificate is contained in the CRL at block 512, then at block 516 the ALB may reject the incoming client certificate received at block 504. At block 518, in both paths (rejection or acceptance of the client certificate), the ALB may update a connection log with the details of the rejected connection. Connection logs may allow customers to inspect the results of a load balancer verification from each TLS connection. In some embodiments, a connection log may include such information as TLS protocol, TLS cipher, TLS handshake latency, client leaf certificate information, client IP address and port, whether the verification succeeded or not, and any other relevant information. At block 518, after entry of the connection details in the connection log, the client certificate verification routine by an ALB using mTLS is complete.

An ALB implementing access control with mTLS and trust store management may, in some embodiments, have two different modes a customer can choose to configure: a "verify" mode and a "passthrough mode." Each of these modes will be discussed in turn in the following FIGS. 6-9.

Figure 7:
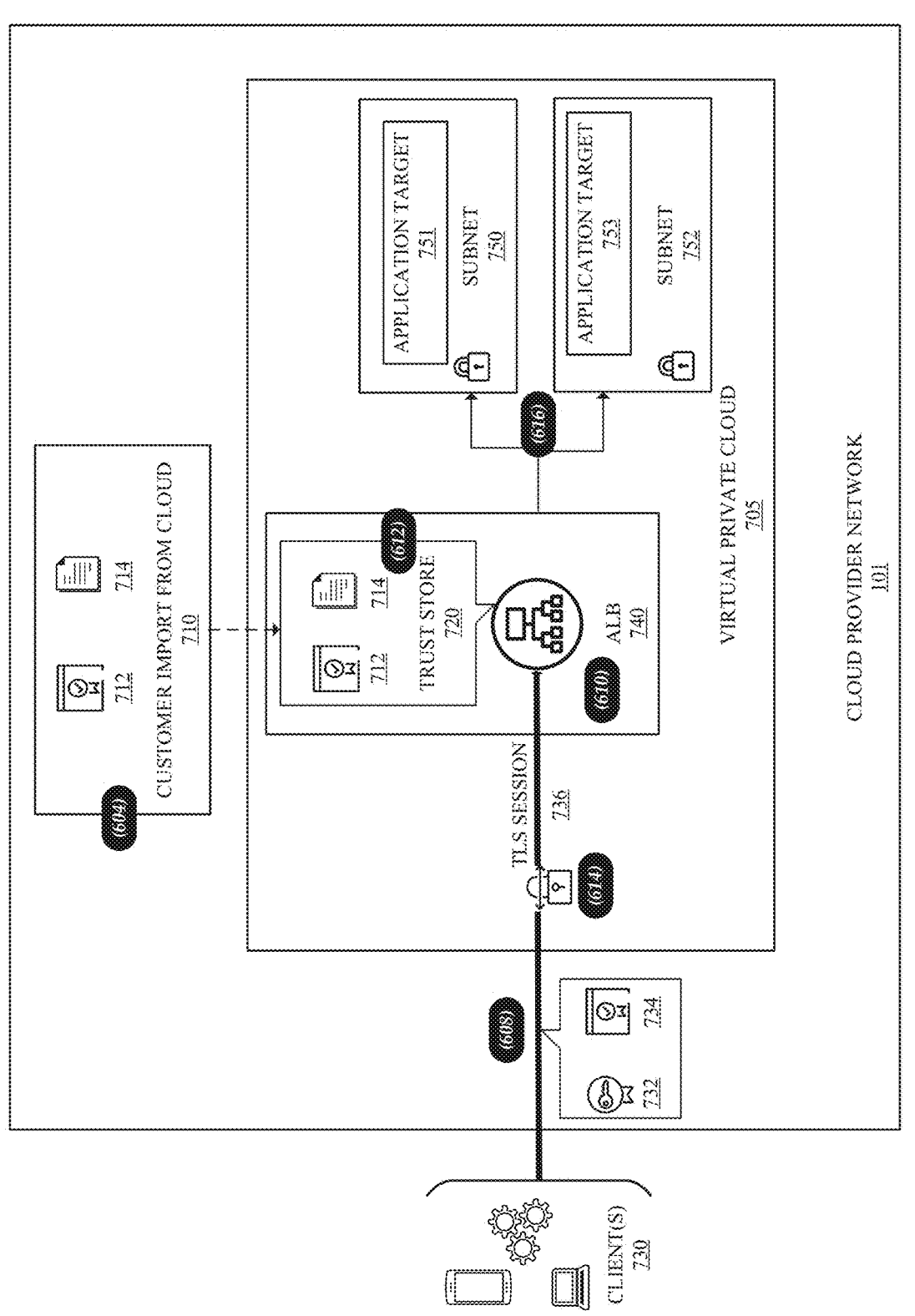
FIG. 7 depicts a schematic diagram of an illustrative cloud provider network with an application load balancer implementing the "verify" mode routine found in FIG. 6 to verify a client certificate before passing along the connection to the application layer, in accordance with aspects of the present disclosure.

FIG. 6 is a flowchart of an example routine for a "verify" mode of an ALB using mTLS for the verification of a client certificate, in accordance with aspects of the present disclosure. The flow of FIG. 6 will be discussed in conjunction with the diagram in FIG. 7. FIG. 7 depicts an illustrative cloud provider network 101 with an ALB 740 implementing the "verify" mode routine found in the flow of FIG. 6 which verifies a client certificate before passing along the connection to the seventh application layer of the network stack containing subnets, in accordance with aspects of the present disclosure.

At block 602 of routine 600, the mTLS verify mode of the ALB 740 begins. At block 604, the cloud provider uploads the CA certificate bundle 712 and the (optionally provided) CRL 714 received from the customer into cloud storage, such as an object storage service. The storage path to the CA certificate bundle 712 and the CRL 714 are provided to the trust store as a customer data import from the cloud 710.

At block 608, the ALB 740 receives an mTLS session initiation request from the client 730. At block 610, an mTLS handshake is conducted according to Routine 500, as described elsewhere in this disclosure. The ALB presents its certificate and receives the client certificate 732 and client CA chain 734 presented by the client 730.

At block 612, the ALB 740 consults the trust store 720 (created in Routine 400, which is described elsewhere in this disclosure) to validate the certificate. If the client certificate 732 is not signed by a trusted CA in the trust store 720, or is contained in the CRL 714, or is expired, client certificate authentication may fail. If client certificate authentication fails, the ALB 740 may reject the TLS connection. In some alternative embodiments, the ALB 740 may be configured by a customer to allow connections for expired certificates.

At block 614, the ALB 740 establishes a successful TLS session 736 with the client 730. At block 616, the ALB 740 may establish a connection (separate from its TLS session with the client 730) with application targets within subnets such as exemplary subnet 750 and subnet 752. In some embodiments, a subnet (e.g., subnet 750 and 752) may represent a range of IP addresses in a virtual private cloud 705. Resources such as compute instances may be launched into a subnet. Of particular interest in this solution, compute instances such as application target 751 and application target 753 may be launched within a subnet, as depicted in FIG. 7. A subnet may connect to the internet, other virtual private clouds, and data centers. Traffic may be routed to and from subnets using route tables. After establishing a connection with the application targets, the ALB 740 may extract key elements from the client certificate 732 at block 617. For example, in some embodiments, key elements of the client certificate may include serial number, issuer, subject, validity, and/or the leaf certificate from the presented chain. In alternative embodiments, any relevant information present in the client certificate 732 may be included among the elements extracted and processed from the client certificate 732 at block 617 by the ALB 740. Further at block 617, the ALB 740 may take the extracted elements from the client certificate 732 and pass them along to the application targets within HTTP headers. In this way, the ALB 740 may save processing cycles that would otherwise need to be performed at the application layer. For example, the target applications may no longer have to parse the entire certificate chain, instead only dealing with the most relevant extracted elements from the ALB 740. In addition, block 617 may allow the ALB 740 to offload resource usage from the customer. Finally at block 618, the routine 600 for the mTLS verify mode of a load balancer concludes.

Figure 8:
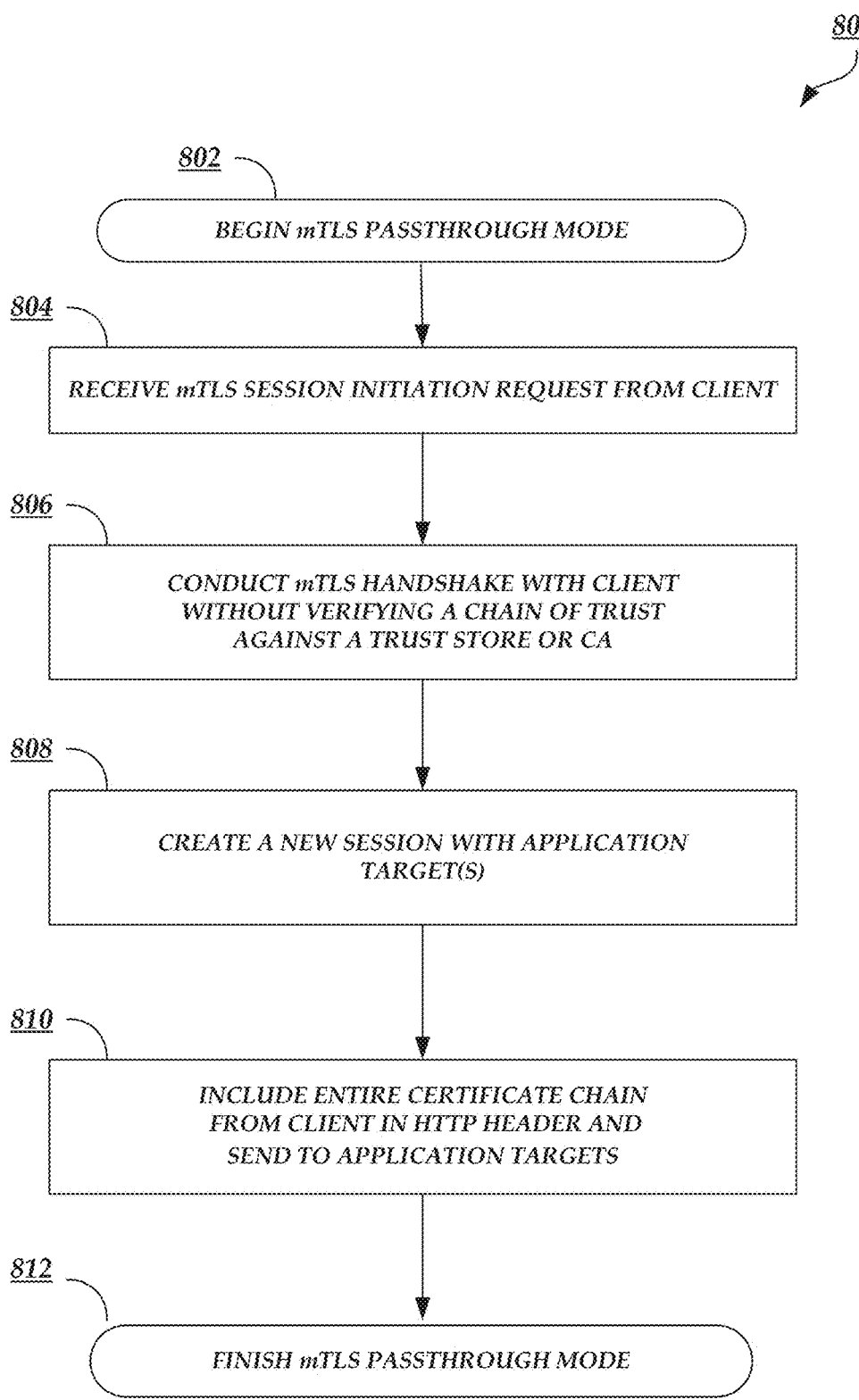
FIG. 8 is a flowchart of an example routine for a "pass-through" mode of an application load balancer using mutual Transport Layer Security for the verification of a client certificate, in accordance with aspects of the present disclosure.
Figure 9:
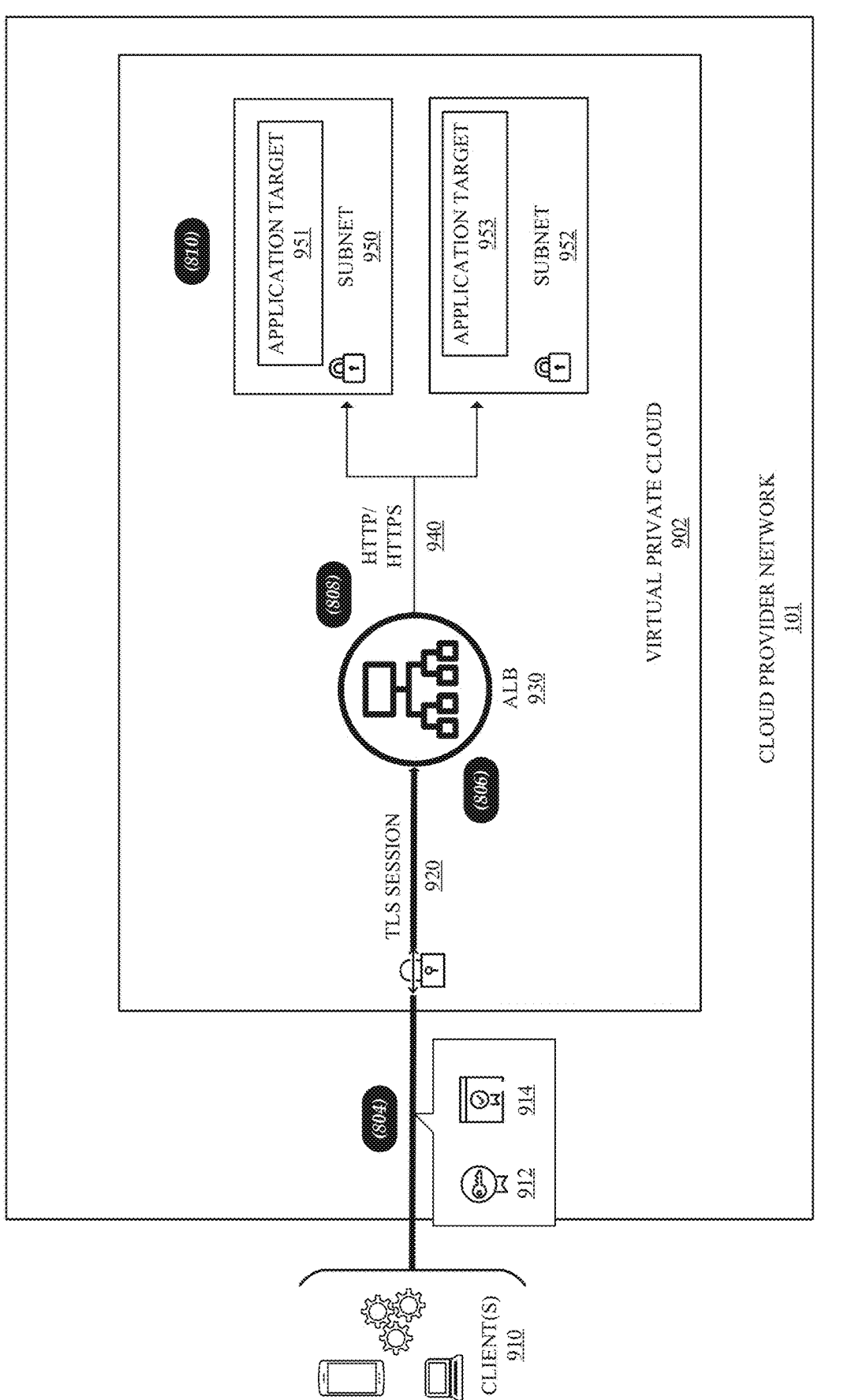
FIG. 9 depicts a schematic diagram of an illustrative cloud provider network with an application load balancer implementing the "passthrough" mode routine found in FIG. 8, allowing pertinent client certificate data to pass through to the application layer in HTTP headers at the application layer, in accordance with aspects of the present disclosure.

FIG. 8 is a flowchart of an example routine for a "passthrough" mode of an ALB using mTLS for the verification of a client certificate, in accordance with aspects of the present disclosure. The flow of FIG. 8 will be discussed in conjunction with the diagram in FIG. 9. FIG. 9 depicts a diagram of an illustrative cloud provider network 101 with an ALB 930 implementing the "passthrough" mode routine found in FIG. 8, allowing pertinent client certificate data to pass through to the application layer in HTTP headers at the application layer, in accordance with aspects of the present disclosure.

At block 802 of routine 800, the mTLS passthrough mode of the ALB 930 begins. At block 804, the ALB 930 receives an mTLS session initiation request from the client 910. At block 806, the ALB 930 conducts a passthrough mTLS handshake with the client 910 without verifying a chain of trust against a trust store or CA. In this way, the responsibility of verification "passes through" to the application layer, rather than happening at the presentation layer within the ALB, as is detailed in the "verify" mode described in FIG. 7.

At block 808, the ALB creates a new HTTP/HTTPS session 940 with the application targets contained within subnet 950 and subnet 952. In this session 940, at exemplary block 810, the ALB 930 may pass client certificate information 912 and 914 (including the entire certificate chain) through HTTP headers to the application targets 951 and 953 within subnet 950 and subnet 952, respectively. At application targets 951 and 953, verification of client certificate information occurs at the seventh application layer of the network stack (rather than conducting the authentication with a load balancer directly at the sixth presentation layer of the network stack, as in "verify" mode). At block 812, the ALB's 930 mTLS passthrough mode is complete.

Partial Validation Against a Trust Store and Trust Store Management

Figure 10:
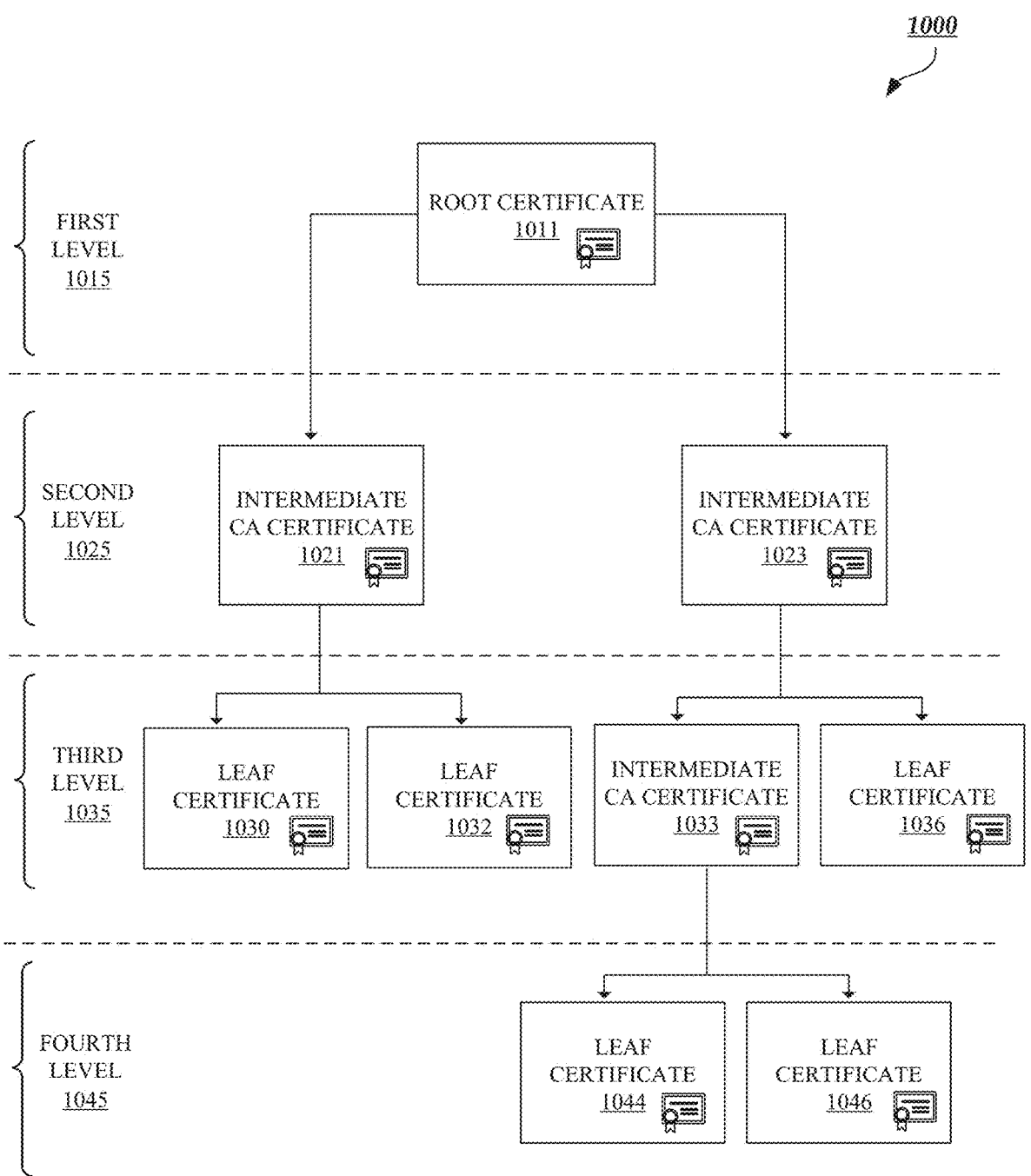
FIG. 10 is a block diagram of an illustrative certificate chain in which partial validation against a trust store may be implemented, according to some embodiments.

FIG. 10 is a block diagram of an illustrative certificate chain 1000 in which partial validation against a trust store may be implemented, according to some embodiments. In order to implement partial validation against a trust store, a certificate chain 1000 may be generated by a CA hierarchy with a top-down approach that begins with a root CA (not pictured) as the parent node at the first level of CA hierarchy. One node at a time, any number of subordinate CAs are added to the hierarchy from the root CA. Each CA in the CA hierarchy adheres to a parent-child relationship of a graph data structure in which accounts for parent nodes can assume the permissions, account structures, and roles of child nodes, but accounts for child nodes have no such reciprocal permission or access over their parent nodes. Each CA in the CA hierarchy may issue a certificate: a root CA issues a root certificate such as the root certificate 1011 in the first level 1015 of exemplary FIG. 10. The root certificate 1011 may sign any number of intermediate CA certificates, such as intermediate CA certificate 1021 and intermediate CA certificate 1023. Intermediate CA certificates may in turn sign any number of subsequent intermediate CA certificates at the next level of the certificate chain (as shown in the example in FIG. 10, in which intermediate CA certificate 1023 at the second level 1025 signs intermediate CA certificate 1033 at the third level 1035). Alternatively, as is shown with intermediate CA certificate 1021, intermediate CA certificates may sign leaf certificates at the end of the chain, such as leaf certificates 1030 and 1032 at the third level 1035 of FIG. 10. In an additional example of this idea from FIG. 10, intermediate CA certificate 1023 signs leaf certificate 1036 at the third level 1035. Similarly, intermediate CA certificate 1033 signs leaf certificates 1044 and 1046 at the fourth level 1045. In some embodiments, leaf certificates allow an end entity or party such as a private organization utilizing cloud services or a browser visiting a webpage to cryptographically verify the identity of another party.

In alternative embodiments not pictured, the root certificate may sign no intermediate CA certificates whatsoever, but rather simply one or more leaf certificates. In short, a certificate chain may have a root certificate, any number of intermediate CA certificates, and at least one leaf certificate.

In some embodiments, trust between end entities may be established and maintained according to the limitations described above through the use of certificate chains stored in trust stores of end entities. For example, an end entity (not pictured) to whom leaf certificate 1030 is issued may store the following certificate chain in its trust store: leaf certificate 1030, (which is signed by) intermediate CA certificate 1021, (which is signed by) root certificate 1011. In this way, a certificate chain traces any given certificate all the way back to its originating root certificate.

In order to communicate securely, two end entities must first establish a foundation of trust with one another. To establish a foundation of trust with one another, the end entities may present their certificate chains to one another for verification. If each end entity trusts the respective root CA that signed the other end entity's root certificate within its certificate chain, both end entities can securely operate on an assumption of trust for communication based on their trust of the other's root CA.

In some embodiments, load balancing and trust store management services 140 provide for an innovation called "partial validation against a trust store." Partial validation against a trust store relies on the fact that a load balancer considers all the certificates uploaded in its trust store as a trusted entity. Consequently, the load balancer's trust store does not need to contain complete certificate chains reaching all the way back to an originating root certificate (e.g., root certificate 1011). Instead, any certificate found in the load balancer's trust store (e.g., intermediate CA certificate 1021) may be considered trustworthy. This results in providing a more secure and accommodating service to customers with high sensitivity about the privacy of their root certificates: such customers do not have to provide the load balancer's trust store with their root certificates or the identity of their root CAs at all; they may elect instead to keep their root identity completely private by submitting intermediate certificates from their certificate chains to the load balancer's trust store for client verification and access control.

The reason an intermediate certificate stored in the trust store of an end entity serves a proxy for trusted communication with other end entities has to do with how the certificate chains are signed in a hierarchical method: parent CAs sign the certificates they issue to their child CAs. Notably, the reverse is not true: child CAs may not sign certificates of parent CAs. For this reason, if an end entity has leaf certificate 1030 and intermediate CA certificate 1021 in its certificate chain, and intermediate CA certificate 1021 is in the trust store of another entity seeking verification, the full evaluation of the certificate chains level by level all the way back to the root certificate (e.g., root certificate 1011) is not necessary. Instead, looking to intermediate CA certificate 1021 in the trust store of another entity seeking verification provides the same result with more efficiency.

APPENDICES

Many other embodiments and configurations of the system described herein are possible, some of which are described in the attached appendices. The enclosed appendices are incorporated herein by reference as if set forth fully herein and are part of this disclosure. Any sub-combination of the features described in the appendices may be used in conjunction with the features described in this disclosure. The contents of webpages at any links in the appendices are herein incorporated by reference. The entirety of AWS's public documentation on the date of filing is herein incorporated by reference. References to a particular cloud provider (ex: AWS) in the documentation will be understood as an example only and not as limiting, as the disclosed techniques can be implemented in other clouds and other distributed computing environments.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" and the word "set" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system, comprising:
a plurality of scalable load balancers configured to enable client certificate access control using mutual transport layer security (mTLS) authentication; and
a trust store manager service comprising computer hardware and configured to:
    receive trust store files including a certificate authority (CA) bundle and a certificate revocation list (CRL);
    generate a single trust store file based on the trust store files, wherein the single trust store file comprises a first database storing the CA bundle and a second database storing the CRL such that determining that the CRL includes a given certificate does not require checking the first database; and
    distribute a snapshot of the single trust store file to the plurality of scalable load balancers,
wherein the plurality of scalable load balancers are further configured to:
    verify, using the snapshot of the single trust store file, a client certificate from a client device by searching for a trusted CA from the CA bundle in the snapshot of the single trust store file;
    determine whether the CRL contained in the snapshot of the single trust store file includes the client certificate; and
    upon verifying the client certificate and determining that the CRL does not contain the client certificate, transmit connection data from the client device to an application target.

2. The system of claim 1, wherein the single trust store file is a lightning memory-mapped database (LMDB) file generated in a pre-indexed format to allow rapid searching, without accessing multiple ones of the trust store files and without loading the single trust store file into memory.

3. The system of claim 2, wherein the scalable load balancer is further configured to:
submit a load balancer certificate to a client for authentication in an mTLS handshake;
receive a client certificate for authentication in an mTLS handshake;
determine that the client certificate is authenticated based at least in part on a signature on the client certificate; and
upon determining the client certificate is authenticated, exchange cryptographic keys with the client to allow encrypted communication with the client.

4. The system of claim 1, wherein the plurality of scalable load balancers are further configured to revoke access of an invalid client certificate based on the invalid client certificate being included in the CRL of the single trust store file.

5. A computer-implemented method comprising:
providing a plurality of scalable load balancers;
receiving, from a client device, a request to connect to an application target, the request including a client certificate for verification by a scalable load balancer of the plurality of scalable load balancers, wherein the scalable load balancer has access to a snapshot of a trust store storing a single memory mappable database management file comprising information usable to verify client certificates;

determining a signing certificate authority (CA) for the client certificate, wherein the signing CA is a CA that produced a signature on the client certificate;

determining a trust store CA for the client certificate, wherein the trust store CA is recorded in the snapshot of the trust store storing the single memory mappable database management file for use by the scalable load balancer during verification;

verifying the client certificate based at least in part on a comparison between the signing CA and the trust store CA; and upon verifying the client certificate, transmitting connection data received from the client device to an application target.

6. The computer-implemented method of claim 5, wherein verifying the client certificate further comprises:

determining the client certificate is contained in a certificate revocation list (CRL) of a trust store; and revoking access of the client certificate based on determining that the client certificate is contained in the CRL.

7. The computer-implemented method of claim 5, wherein verifying the client certificate further comprises:

determining the client certificate is not contained in a certificate revocation list (CRL) of a trust store; and allowing access to the client certificate based at least in part on determining that the client certificate is not contained in the CRL.

8. The computer-implemented method of claim 5, wherein the single memory mappable database management file is a lightning memory database (LMDB) file using a pre-indexed format to allow rapid searching, without requiring the single memory mappable database management file to be loaded into memory, and without accessing multiple files.

9. The computer-implemented method of claim 5, further comprising:

submitting, using the scalable load balancer, a load balancer certificate to a client for authentication in an mTLS handshake;

receiving a client certificate for authentication in the scalable load balancer in an mTLS handshake;

determining that the client certificate is authenticated based at least in part on a signature on the client certificate; and upon determining the client certificate is authenticated, exchange cryptographic keys with the client to allow encrypted communication with the client.

10. The computer-implemented method of claim 5, further comprising generating a connection log, wherein the connection log allows a user to inspect a verification result of each TLS connection, and wherein the connection log identifies a TLS protocol, TLS cipher, TLS handshake latency, a client's leaf certificate information, and whether verification was successful or not.

11. The computer-implemented method of claim 5, further comprising implementing a pass through mode for access control, wherein the scalable load balancer passes an incoming client certificate to one or more load balancer targets for validation without validating the incoming client certificate at the scalable load balancer.

12. The computer-implemented method of claim 5, further comprising implementing a verify mode for access control, wherein the scalable load balancer authenticates an incoming client certificate at the scalable load balancer using a mutual transport layer security (mTLS) handshake.

13. A non-transitory computer readable medium storing instructions that, when executed by a computing system within a cloud provider network, cause the computing system to perform operations including:

providing a plurality of scalable load balancers;

receiving a client certificate for verification by a scalable load balancer of the plurality of scalable load balancers, wherein the scalable load balancer comprises a trust store to store a single memory mappable database management file, and wherein a snapshot of the trust store is distributed across the plurality of scalable load balancers and any number of a plurality of customer accounts;

determining a signing certificate authority (CA) for the client certificate, wherein the signing CA is a CA that produced a signature on the client certificate;

determining a trust store CA for the client certificate, wherein the trust store CA is recorded in the snapshot of the trust store storing the single memory mappable database management file for use by the scalable load balancer during verification;

verifying the client certificate based at least in part on a comparison between the signing CA and the trust store CA.

14. The non-transitory computer readable medium of claim 13, wherein verifying the client certificate further comprises:

determining the client certificate is contained in a certificate revocation list (CRL) of the trust store; and revoking access of the client certificate based on determining that the client certificate is contained in the CRL.

15. The non-transitory computer readable medium of claim 13, wherein verifying the client certificate further comprises:

determining the client certificate is not contained in a certificate revocation list (CRL) of the trust store; and allowing access to the client certificate based at least in part on determining that the client certificate is not contained in the CRL.

16. The non-transitory computer readable medium of claim 13, wherein the single memory mappable database management file is a lightning memory database (LMDB) file using a pre-indexed format to allow rapid searching, without requiring the single memory mappable database management file to be loaded into memory, and without accessing multiple files.

17. The non-transitory computer readable medium of claim 13, further comprising:

submitting, using the scalable load balancer, a load balancer certificate to a client for authentication in an mTLS handshake;

receiving a client certificate for authentication in the scalable load balancer in an mTLS handshake;

determining that the client certificate is authenticated based at least in part on a signature on the client certificate; and upon determining the client certificate is authenticated, exchange cryptographic keys with the client to allow encrypted communication with the client.

18. The non-transitory computer readable medium of claim 13, further comprising generating a connection log, wherein the connection log allows a user to inspect a verification result of each TLS connection, and wherein the connection log identifies a TLS protocol, TLS cipher, TLS handshake latency, a client's leaf certificate information, and whether verification was successful or not.

19. The non-transitory computer readable medium of claim 13, further comprising implementing a pass through mode for access control, wherein the scalable load balancer passes an incoming client certificate chain to one or more load balancer targets for validation without validating the incoming client certificate chain at the scalable load balancer.

20. The non-transitory computer readable medium of claim 13, further comprising implementing a verify mode for access control, wherein the scalable load balancer authenticates an incoming client certificate chain at the scalable load balancer using a mutual transport layer security (mTLS) handshake.

\* \* \* \* \*